(12) United States Patent
Watanabe

(10) Patent No.: US 11,378,932 B2
(45) Date of Patent: Jul. 5, 2022

(54) ARITHMETIC DEVICE

(71) Applicant: FANUC CORPORATION, Minamitsuru-gun (JP)

(72) Inventor: Daiki Watanabe, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 77 days.

(21) Appl. No.: 15/930,167

(22) Filed: May 12, 2020

(65) Prior Publication Data
US 2020/0371489 A1 Nov. 26, 2020

(30) Foreign Application Priority Data

May 20, 2019 (JP) .............................. JP2019-094667

(51) Int. Cl.
*G05B 19/402* (2006.01)
*G05B 19/4063* (2006.01)
*G05B 19/4155* (2006.01)
*G05B 19/18* (2006.01)

(52) U.S. Cl.
CPC ......... *G05B 19/402* (2013.01); *G05B 19/182* (2013.01); *G05B 19/4063* (2013.01); *G05B 19/4155* (2013.01)

(58) Field of Classification Search
CPC .............. G05B 19/402; G05B 19/4063; G05B 19/4155; G05B 19/182; G05B 2219/36088; G05B 2219/36101; G05B 19/4083; B23H 7/02; B23H 11/00
See application file for complete search history.

(56) References Cited

U.S. PATENT DOCUMENTS

| 5,453,592 | A | * | 9/1995 | Takeuchi | ................. B23H 7/20 219/69.17 |
|---|---|---|---|---|---|
| 6,220,926 | B1 | * | 4/2001 | Mizuno | ..................... B24B 9/14 451/255 |
| 6,463,835 | B1 | * | 10/2002 | Segawa | ............. B23B 31/16025 82/1.11 |
| 2004/0011767 | A1 | * | 1/2004 | Hattori | ................... B23H 7/065 219/69.12 |
| 2006/0173572 | A1 | * | 8/2006 | Sagasaki | ............ G05B 19/4155 700/181 |
| 2007/0119821 | A1 | | 5/2007 | Kaneko | |

(Continued)

FOREIGN PATENT DOCUMENTS

| JP | 06143037 | A | * | 5/1994 |
|---|---|---|---|---|
| JP | H 08-155743 | A | | 6/1996 |

(Continued)

*Primary Examiner* — Thomas C Lee
*Assistant Examiner* — Michael Tang
(74) *Attorney, Agent, or Firm* — McGinn IP Law Group, PLLC

(57) ABSTRACT

An arithmetic device includes: a storage unit for storing a plurality of machining programs for wire electrical discharge machining, each program being associated with a machining condition corresponding to the machining program; an acquisition unit for acquiring an adjustment ratio of the machining condition input by an operator; and a storage control unit for, when the acquisition unit acquires the adjustment ratio, storing the acquired adjustment ratio in the storage unit in association with the machining program.

20 Claims, 9 Drawing Sheets

(56) References Cited

U.S. PATENT DOCUMENTS

| | | | | |
|---|---|---|---|---|
| 2008/0251500 A1* | 10/2008 | Hiraga | ............... | B23H 7/065 |
| | | | | 219/69.12 |
| 2010/0305758 A1* | 12/2010 | Nishi | ............ | G05B 19/41825 |
| | | | | 700/264 |
| 2011/0056267 A1* | 3/2011 | Qin | ..................... | H01L 24/78 |
| | | | | 73/1.82 |
| 2013/0220979 A1* | 8/2013 | Yamaoka | ............ | B23H 7/065 |
| | | | | 219/69.12 |

FOREIGN PATENT DOCUMENTS

| | | | |
|---|---|---|---|
| JP | 2688128 | B2 | 12/1997 |
| JP | 2000-284820 | A | 10/2000 |
| JP | 2002-036031 | A | 2/2002 |
| JP | 2004-142084 | A | 5/2004 |
| JP | 2007-144567 | A | 6/2007 |

\* cited by examiner

FIG. 2

| NAME OF COMMON FILE | MACHINING PROGRAM | ADJUSTMENT RATIO (%) | MACHINING CONDITION. OFFSET AMOUNT |
|---|---|---|---|
| Test1 | 100 | 90 | S50 D50 |
| Test2 | 101 | 70 | S75 D75 |
| Test3 | 102 | 110 | S122 D122 |
| Test4 | 103 | 80 | S27 D27 |
| .. | .. | .. | .. |

FIG. 3

| NAME OF COMMON FILE | MACHINING PROGRAM | ADJUSTMENT RATIO (%) | MACHINING CONDITION OFFSET AMOUNT | | |
|---|---|---|---|---|---|
| Test1 | 100 | 90 | S50 D50 | START | ADJUSTMENT |
| Test2 | 101 | 70 | S75 D75 | START | ADJUSTMENT |
| Test3 | 102 | 110 | S122 D122 | START | ADJUSTMENT |
| Test4 | 103 | 80 | S27 D27 | START | ADJUSTMENT |
| : | : | : | | START | ADJUSTMENT |

FIG. 4

| NAME OF COMMON FILE | MACHINING PROGRAM | ADJUSTMENT RATIO (%) | MACHINING CONDITION, OFFSET AMOUNT | | |
|---|---|---|---|---|---|
| Test1 | 100 | 90 | S50 D50 | START | ADJUSTMENT |
| Test2 | 101 | 70 | S75 D75 | START | ADJUSTMENT |
| Test3 | 102 | 110 | S122 D122 | START | ADJUSTMENT |
| Test4 | 103 | 80 | S27 D27 | START | ADJUSTMENT |
| ⋮ | ⋮ | ⋮ | ⋮ | START | ADJUSTMENT |

28a — 90 SET

ARITHMETIC DEVICE

CROSS-REFERENCE TO RELATED APPLICATION

This application is based upon and claims the benefit of priority from Japanese Patent Application No. 2019-094667 filed on May 20, 2019, the contents of which are incorporated herein by reference.

BACKGROUND OF THE INVENTION

Field of the Invention

The present invention relates to an arithmetic device that controls wire electrical discharge machining.

Description of the Related Art

As described in Japanese Patent No. 2688128, conventionally, it has been common practice for an operator to adjust machining conditions of wire electrical discharge machining by operating switches and control knobs.

SUMMARY OF THE INVENTION

At present, the adjustment of machining conditions is performed manually by an operator as described above. In this case where the machining conditions are manually adjusted so as to perform appropriate machining, the manual adjustment is needed every time machining based on the same machining program is executed, which gives rise to a problem that the adjustment increases workload.

It is therefore an object of the present invention to provide an arithmetic device capable of reducing the workload for adjusting the machining conditions in wire electrical discharge machining.

An aspect of the present invention resides in an arithmetic device including: a storage unit configured to store a plurality of machining programs for wire electrical discharge machining, each of the machining programs being associated with a machining condition corresponding to the machining program; an acquisition unit configured to acquire an adjustment ratio of the machining condition input by an operator; and a storage control unit configured to, when the acquisition unit acquires the adjustment ratio, store the acquired adjustment ratio in the storage unit in association with the machining program.

According to the present invention, it is possible to reduce the workload for adjusting the machining conditions in wire electrical discharge machining.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a diagram showing contents stored in a storage unit;

FIG. 3 is a diagram showing a display screen of a display unit;

FIG. 4 is a diagram showing a display screen when a machining program is selected;

FIG. 6 is a diagram showing an example of a machining program;

DESCRIPTION OF THE PREFERRED EMBODIMENTS

An arithmetic device according to the present invention will be detailed hereinbelow by giving a preferred embodiment with reference to the accompanying drawings.

Embodiment

Figure 1:
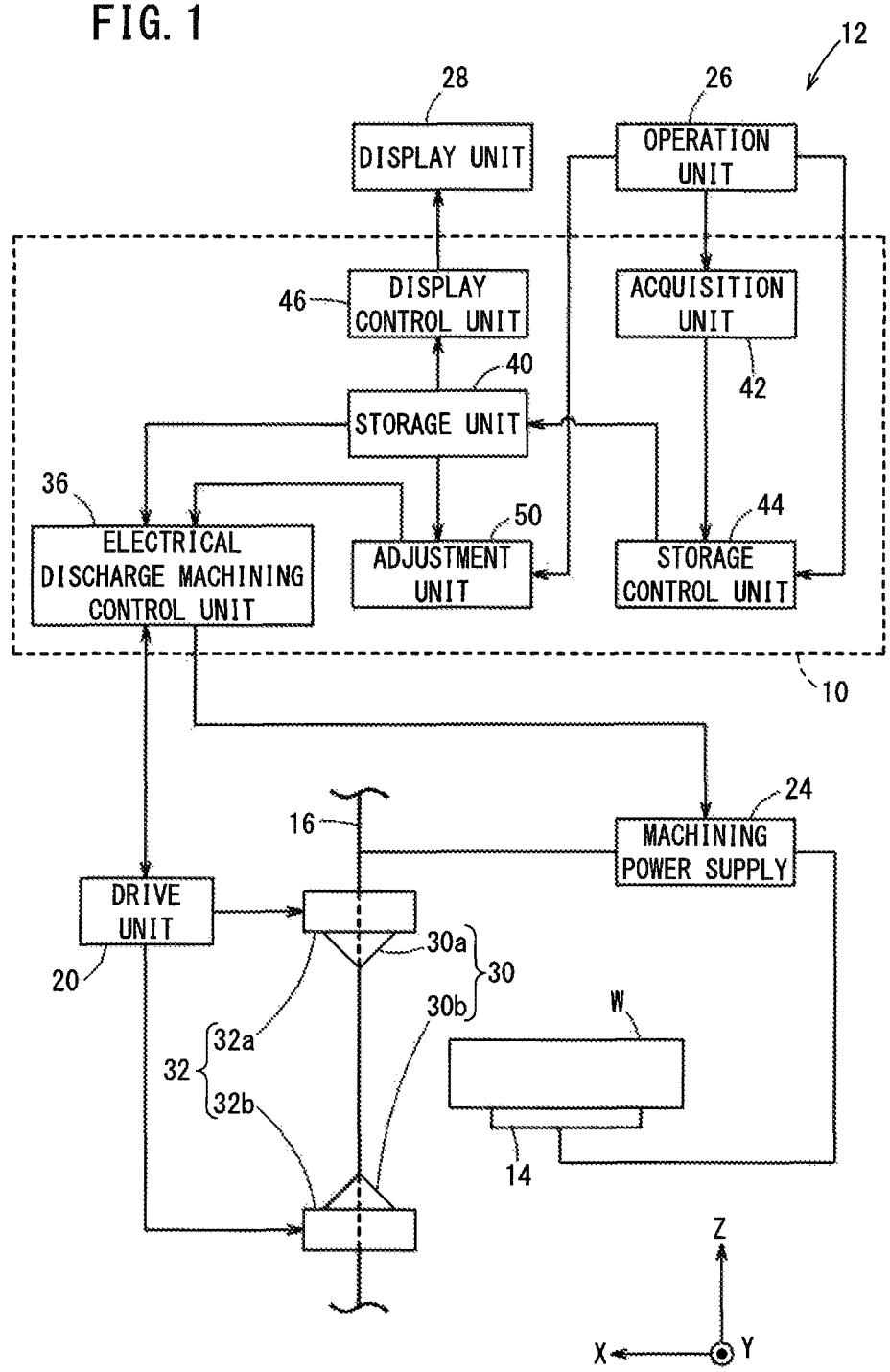
FIG. 1 is a schematic configuration diagram of a wire electrical discharge machine including an arithmetic device according to an embodiment.

FIG. 1 is a schematic configuration diagram of a wire electrical discharge machine 12 including an arithmetic device 10 according to the embodiment. The wire electrical discharge machine 12 performs electrical discharge machining on a workpiece W by applying voltage to a gap formed between a wire electrode 16 and the workpiece W to generate electrical discharge while moving the wire electrode 16 relative to the workpiece W mounted on a table 14 along a path specified by a predetermined machining program (numerical control program). The X-axis, Y-axis and Z-axis shown in FIG. 1 are orthogonal to each other, and gravity acts in the Z-axis negative direction. The wire electrical discharge machine 12 includes a drive unit 20, a machining power supply 24, an operation unit 26, a display unit 28, and an arithmetic device 10 as a control device.

The wire electrical discharge machine 12 further includes the table 14 on which the workpiece W is mounted, an upper wire guide 30a supporting the wire electrode 16 on the upper side (positive Z-axis side) of the workpiece W, a lower wire guide 30b supporting the wire electrode 16 on the lower side (negative Z-axis side) of the workpiece W, an upper guide block 32a in which the upper wire guide 30a is installed and a lower guide block 32b in which the lower wire guide 30b is installed. The upper wire guide 30a and the lower wire guide 30b are hereinafter collectively referred to as upper and lower wire guides 30. The upper guide block 32a and the lower guide block 32b are hereinafter collectively referred to as upper and lower guide blocks 32.

The drive unit 20 drives the upper and lower guide blocks 32 in order to move the wire electrode 16 and the upper and lower wire guides 30 relative to the workpiece W in the X-axis and Y-axis directions. The drive unit 20 includes motors (not shown), motor encoders (not shown), and drive transmission mechanisms (not shown). The drive transmission mechanisms include ball screws and nuts mounted on the upper and lower guide blocks 32, for thereby converting the rotational motion of the motors for the X-axis and Y-axis directions into linear motion of the upper and lower guide blocks 32 in the X-axis and Y-axis directions.

Note that the drive unit 20 may drive the table 14 instead of the upper and lower guide blocks 32 as long as the wire electrode 16 can be moved relative to the workpiece W.

Alternatively, the drive unit 20 may drive both the upper and lower guide blocks 32 and the table 14.

The machining power supply 24 is connected to the wire electrode 16 and the table 14 to supply voltage to an electrode gap between the wire electrode 16 and the workpiece W.

The operation unit 26 is an interface such as a mouse and a keyboard for allowing the operator to input an adjustment ratio of machining conditions and to select and execute an aftermentioned machining program. The operation unit 26 may be provided in the arithmetic device 10.

The display unit 28 displays machining programs, machining conditions, and adjustment ratios. The display unit 28 may be provided in the arithmetic device 10. The display unit 28 and the operation unit 26 may be integrated using a touch panel or the like.

The arithmetic device 10 is a numerical control device having a processor such as a CPU and a memory, and serves as the arithmetic device 10 of the present embodiment by executing a program stored in the memory. The arithmetic device 10 includes an electrical discharge machining control unit 36, a storage unit 40, an acquisition unit 42, a storage control unit 44, a display control unit 46, and an adjustment unit 50.

The electrical discharge machining control unit 36 controls the drive unit 20 to move the upper and lower guide blocks 32 in accordance with the machining program and machining conditions stored in the storage unit 40, thereby causing the workpiece W and the wire electrode 16 to move relative to each other to control the position of the wire electrode 16 relative to the workpiece W in the X-axis direction and the Y-axis direction. Then, the electrical discharge machining control unit 36 controls the machining power supply 24 according to machining conditions to apply machining voltage across the discharge gap while moving the wire electrode 16 relative to the workpiece W. Thus, electrical discharge machining is performed.

FIG. 2 is a diagram showing the contents stored in the storage unit 40. As shown in FIG. 2, the storage unit 40 stores a plurality of machining programs for wire electrical discharge machining, each program being associated with certain machining conditions to form one common file. In FIG. 2, the names of the common files are shown as "Test1", "Test2", "Test3", "Test4", and so on. In FIG. 2, though in addition to the machining conditions the offset amount is associated with the machining program and included in each common file, the offset amount is not necessarily required to be included in the common file.

Codes starting with "S" (hereinafter referred to as "S code") such as "S50", "S51", . . . in FIG. 2 are each a code that specifies a combination of specific machining conditions including the machining voltage, the pause time during which no machining voltage is applied (off time), the relative speed (setup feedrate) of the wire electrode 16 relative to the workpiece W, the amount of dielectric working fluid, the wire tension. The combination of specific machining condition values specified by the S code is also stored in the storage unit 40. Codes starting with "D" (hereinafter referred to as D codes) such as "D50", "D51", . . . in FIG. 2 are each a code that specifies the value of the offset amount. The specific value of the offset amount specified by the D code is, for example, a value such as 0.2 mm or 0.25 mm, and is stored in the storage unit 40. The offset amount is an amount of offset of the advancing wire electrode 16 to be added to the programmed path when the machining program includes an offset command.

The acquisition unit 42 acquires the adjustment ratio input by the operator via the operation unit 26.

When the acquisition unit 42 acquires the adjustment ratio corresponding to a machining condition, the storage control unit 44 stores the acquired adjustment ratio in the storage unit 40 in association with the machining program associated with the machining condition. Specifically, as shown in FIG. 2, the adjustment ratio is stored so as to be included in the common file in association with the machining program selected as described later.

When, with the adjustment ratio having been already stored in the storage unit 40 in association with the machining program, the acquisition unit 42 acquires a new adjustment ratio input through the operation unit 26 by the operator, the storage control unit 44 overwrites the adjustment ratio already stored in the storage unit 40 with the newly obtained adjustment ratio.

The display control unit 46 causes the display unit 28 to display a list of a plurality of machining programs in association with machining conditions and adjustment ratio stored in the storage unit 40 for each machining program. FIG. 3 is a diagram showing a display screen of the display unit 28. Specifically, common files are displayed in a list, line by line, each including a machining program, an adjustment ratio (%), machining conditions, and an offset amount, as shown in FIG. 3. The operator can select a machining program from the lines in FIG. 3 through the operation unit 26. FIG. 4 is a diagram showing a display screen when a machining program has been selected.

In FIG. 3, when the operator presses or clicks the "ADJUSTMENT" field on the same line as one of the machining programs, the machining program on the line is selected and the adjustment ratio for the machining condition associated with the machining program becomes adjustable. That is, as shown in FIG. 4, the line of the selected machining program is surrounded by a thick frame, and at the same time, a pop-up 28a for enabling the operator to adjust the adjustment ratio appears. The value of the adjustment ratio displayed on the pop-up 28a can be changed by the operator operating the operation unit 26. After the operator operates the operation unit 26 to change the adjustment ratio and then presses or clicks "SET" on the pop-up 28a, the acquisition unit 42 acquires the changed adjustment ratio, and the storage control unit 44 stores the changed adjustment ratio in association with the machining program, in the storage unit 40. The display control unit 46 causes the display unit 28 to display the adjustment ratio after the change. Note that, without displaying the pop-up 28a, a configuration may be adopted in which the operator directly changes the numerical value in the corresponding field for adjustment ratio (%) in FIG. 4 so that the acquisition unit 42 can obtain the adjustment ratio after the change. In this way, the operator can perform setting so that the adjustment unit 50 adjusts the machining conditions corresponding to the selected machining program based on the changed adjustment ratio.

In FIG. 3, when the "START" field on the same line as one of the machining programs is pressed or clicked by the operator, the machining program is selected and the execution of the machining program is instructed. The adjustment unit 50, on receiving this command, adjusts the machining conditions associated with the machining program, based on the adjustment ratio associated with the machining program in the storage unit 40. Then, the adjustment unit 50 gives the adjusted machining conditions to the electrical discharge machining control unit 36. The electrical discharge machining control unit 36, in accordance with the machining program and the adjusted machining conditions, performs electrical discharge machining on the workpiece W by applying voltage across the discharge gap while moving the wire electrode 16 relative to the workpiece W. Herein, the values of the machining conditions are adjusted based on the adjustment ratio (%), on the assumption that the machining conditions stored in the storage unit 40 correspond to 100% (initial set values).

If the adjustment ratio stored in the storage unit 40 is, for example, 80%, the relative speed of the wire electrode 16 to the workpiece W is adjusted to be 80% of the initial set value. At the same time, the discharge power is also adjusted based on a discharge power adjustment ratio that is determined based on the adjustment ratio. The discharge power adjustment ratio may be the same value as the adjustment ratio, or may be greater or smaller than the adjustment ratio.

When it is desired to change the machining conditions while keeping the width of the machined groove unchanged, it is necessary to reduce the relative speed between the wire electrode 16 and the workpiece W together with the discharge power, or to increase both the relative speed and the discharge power. Therefore, in order to prevent breakage of the wire electrode 16, the relative speed should be reduced together with the discharge power. For example, when the adjustment ratio is 80%, the adjustment unit 50 sets the relative speed among the machining conditions to 80% and lowers the discharge power in accordance with a discharge power adjustment ratio corresponding to the adjustment ratio of 80%. The adjustment unit 50 adjusts at least one of the pause time of voltage application and the machining voltage, among the machining conditions, in order to reduce the discharge power. The longer the pause time, the lower the discharge power, and the lower the machining voltage, the lower the discharge power. In any case, since the relative speed of the wire electrode 16 to the workpiece W is reduced while the discharge power is lowered, it is possible to keep the machined groove width at the same width as before the adjustment of the machining conditions while preventing breakage of the wire electrode 16. In a case where a wire breakage has occurred in the machining that uses the machining conditions adjusted based on the adjustment ratio stored in association with the machining program in the storage unit 40, the operator presses or clicks the "ADJUSTMENT" field in FIG. 3, so as to overwrite the adjustment ratio stored in the storage unit 40 with an adjustment ratio that does not cause wire breakage.

In the arithmetic device 10 according to the present embodiment, since each of the plurality of machining programs is stored as one file in which the machining conditions and the adjustment ratio set at an appropriate value are associated with each other, machining under the same machining conditions can be repeated appropriately by reading out and executing the file. Once an appropriate adjustment ratio is determined and stored in the storage unit 40 in association with the machining program and the machining conditions, it is no longer necessary to readjust the adjustment ratio when the same machining program is used again for machining. As a result, it possible to reduce the workload for adjustment of the machining conditions. Thus, the arithmetic device 10 of the present embodiment is particularly effective in machining a non-mass-produced product, for which the wire electrical discharge machine 12 is used to machine only once every three months or six months.

Further, the arithmetic device 10 may be configured to detect whether a breakage of the wire electrode 16 occurs by changing the adjustment ratio stepwise for a given machining program and its machining conditions and causing the electrical discharge machining control unit 36 to perform machining based on the changed adjustment ratio. By automatically performing such trial and error, the arithmetic device 10 can by itself find the adjustment ratio at which the wire electrode 16 will not be broken, and cause the storage control unit 44 to hold the found adjustment ratio in the storage unit 40. Specifically, the arithmetic device 10 performs machining by lowering the adjustment ratio stepwise; if wire breakage occurs when the adjustment ratio is 100%, 90% and 80%, and no wire breakage occurs when the adjustment ratio is 70%, the storage control unit 44 causes the storage unit 40 to store 70% as the adjustment ratio associated with the machining conditions. In addition, the arithmetic device 10 performs machining by increasing the adjustment ratio stepwise; if no wire breakage occurs when the adjustment ratio is 100%, 110% and 120%, and a wire breakage occurs when the adjustment ratio is 130%, the storage control unit 44 causes the storage unit 40 to store 120% as the adjustment ratio associated with the machining conditions. In this way, the arithmetic device 10 may be configured to automatically determine the limit value of the adjustment ratio at which the wire electrode 16 will not break, and store the limit value in the storage unit 40.

MODIFIED EXAMPLES

The above embodiment may be modified as follows.

Modified Example 1

Figure 5:
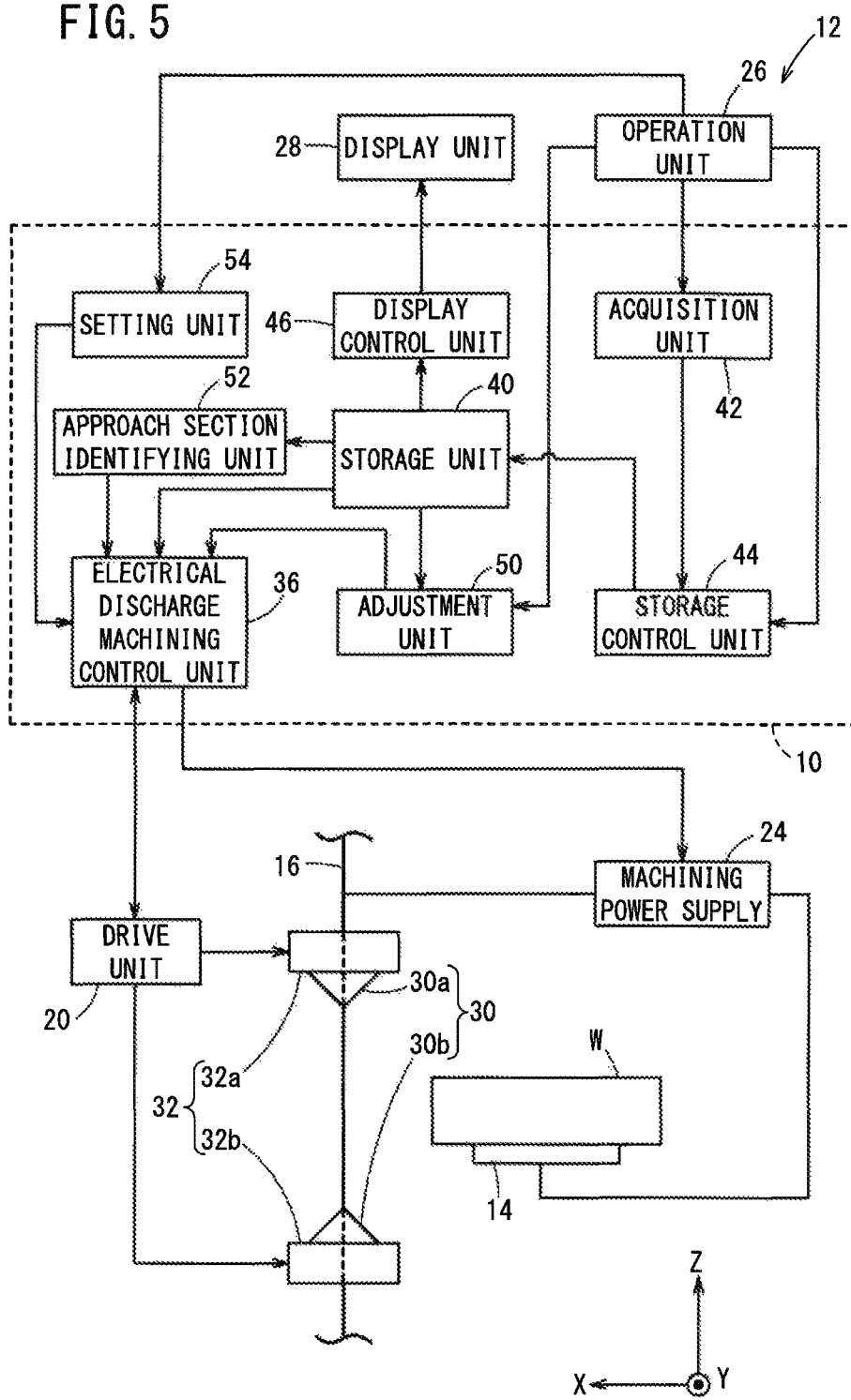
FIG. 5 is a schematic configuration diagram of a wire electrical discharge machine including an arithmetic device according to a modified example 1.

In the above embodiment, the machining conditions for the entire machining process are adjusted based on the adjustment ratio. However, breakage of the wire electrode 16 often occurs at the start of cutting in rough machining mode of wire electrical discharge machining, because generation of electrical discharge takes place intensively when a non-machining state transitions to a machining state. To deal with this, in this modified example 1, the machining conditions are automatically adjusted based on the adjustment ratio in the approach section including the cutting start point. FIG. 5 is a schematic configuration diagram showing a wire electrical discharge machine 12 including a arithmetic device 10 according to the modified example 1. Though in the arithmetic device 10 of the modified example 1, an approach section identifying unit 52 and a setting unit 54 are added to the arithmetic device 10 shown in FIG. 1, the other functions are the same as those of the arithmetic device 10 of the above embodiment, and their description is thus omitted. Hereinafter, the added functions of the arithmetic device 10 of the modified example 1 will be described.

The approach section identifying unit 52 identifies an approach section of the machining path for the wire electrode 16 with respect to the workpiece W, based on the machining program. The approach section is a section that extends a certain distance from the start of cutting (the machining start point). In order to explain how the approach section identifying unit 52 identifies the approach section, a machining program will be described first. FIG. 6 is a diagram showing an example of a machining program.

"S1" on the first line of FIG. 6 is an S code described in the above embodiment. "D1" on the first line in FIG. 6 is a D code described in the above embodiment. "G92" on the second line in FIG. 6 is a code for setting a coordinate system, and "X0.0000 Y0.0000" indicates the coordinates of the machining start point. The unit of the coordinates in this machining program is millimeter (mm).

"G91" on the third line of FIG. 6 is a code for specifying a movement amount from the current position (relative movement command). "G01" on the third line in FIG. 6 is a code for a command of linear interpolation. "G41" on the third line in FIG. 6 is a code for an offset command, which is a command for shifting the machining path to the left of the movement direction of the wire electrode 16 from the programmed path after the coordinates "X0.Y-6" by adding an offset amount to the left side of the programmed path.

Figure 7:
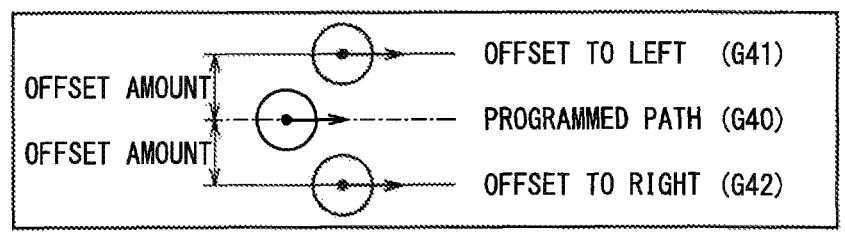
FIG. 7 is a diagram for explaining command content of an offset command code.

FIG. 7 is a diagram for explaining details of the code for the offset command. "G41" is a command code for shifting the machining path to the left of the movement direction of the wire electrode 16 from the programmed path by adding an offset amount to the left side of the programmed path. "G42" is a command code for shifting the machining path to the right of the movement direction of the wire electrode 16 from the programmed path by adding an offset amount to the right side of the programmed path. As the offset amount of "G41" and "G42", the value specified by "D1" on the first line of FIG. 6 is used. "G40" is a code for instructing cancellation of the shifting to return the wire electrode 16 path to the programmed path, that is, "G40" has a function of canceling the offset command of "G41" and "G42".

Accordingly, the path of the wire electrode 16 specified by the commands from "G41" on the third line of FIG. 6 to "G40" on the ninth line in FIG. 6 is a machining path shifted to the left of the movement direction of the wire electrode 16 from the programmed path by adding an offset amount to the left of the programmed path. That is, the approach section is a section that extends from "X0.0000 Y0.0000" (machining start point) on the second line in FIG. 6 to the approach end point. The approach end point is a point shifted from the point of the coordinate "X0.Y-6" on the third line in FIG. 6 in the Y-axis direction by the offset amount. Therefore, the approach section identifying unit 52 can identify an approach section included in the machining path, based on codes such as "G41" and "G42" in the machining program.

Figure 8:
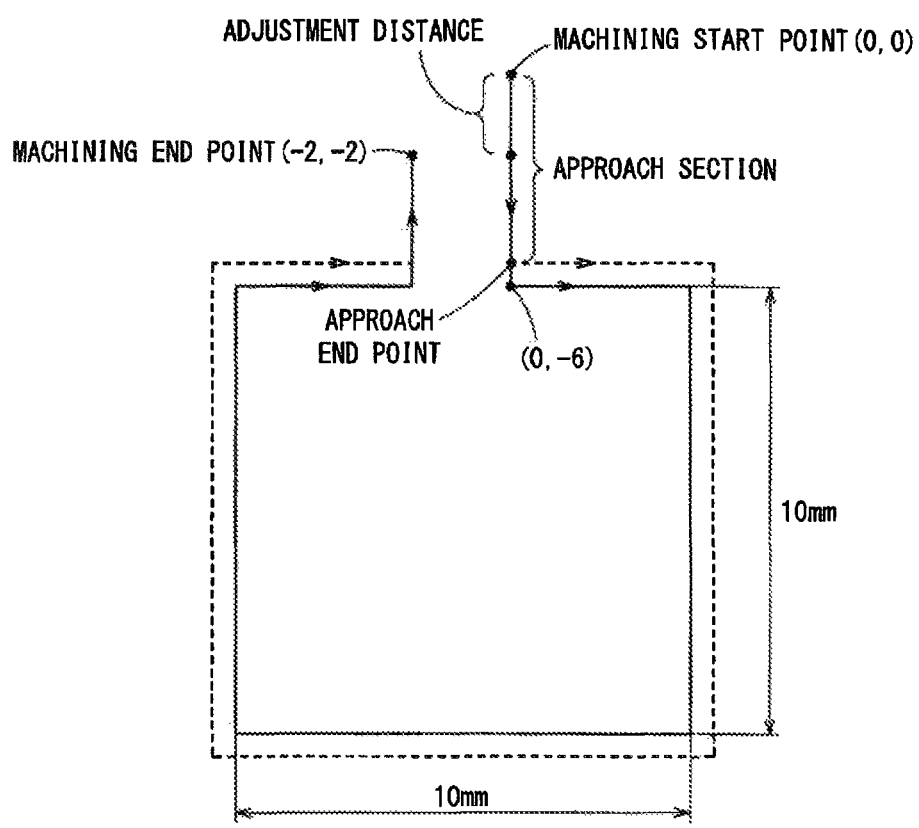
FIG. 8 is a diagram showing a path of the wire electrode based on the machining program in FIG. 6.

FIG. 8 is a diagram showing a path of the wire electrode 16 based on the machining program of FIG. 6. The path programmed in the machining program is indicated by the solid line, and the path with an offset is indicated by the broken line. The wire electrode 16 advances along the path with an offset added, indicated by the broken line, from the approach end point. The approach section identifying unit 52 identifies, as an approach section, the section from the machining start point (0, 0), which is the cutting start point, to the approach end point.

Then, the adjustment unit 50 adjusts the machining conditions, based on the adjustment ratio stored in association with the machining conditions in the storage unit 40, in the approach section identified by the approach section identifying unit 52, and the electrical discharge machining control unit 36 performs control of electrical discharge machining using the adjusted machining conditions. After the wire electrode 16 has passed through the approach section, the electrical discharge machining control unit 36 performs control of electrical discharge machining using the original machining conditions stored in the storage unit 40 that are not adjusted based on the adjustment ratio.

In the above description, in the entire approach section, the electrical discharge machining control unit 36 performs electrical discharge machining control based on the adjusted machining conditions. However, the electrical discharge machining control unit 36 may be configured to perform electrical discharge machining control using machining conditions adjusted based on a preset adjustment ratio in a specified section that extends a preset adjustment distance from the start of cutting in the approach section. Specifically, the setting unit 54 sets a distance that is designated by the operator through the operation unit 26 as the adjustment distance to be used by the electrical discharge machining control unit 36. FIG. 8 shows an adjustment distance from the start of cutting in the approach section. The electrical discharge machining control unit 36 performs electrical discharge machining control using the adjusted machining conditions, from the start of cutting up to the adjustment distance designated by the setting unit 54. After the moving distance of the wire electrode 16 from the start of cutting has exceeded the adjustment distance, the electrical discharge machining control unit 36 executes electrical discharge machining control using the original (i.e., unadjusted) machining conditions. By enabling electrical discharge machining control using the adjusted machining conditions from the start of cutting to the adjustment distance, the operator can optionally designate a range of machining subject to the adjusted machining conditions, in the approach section, by taking into account the machining shape and other factors.

Figure 9:
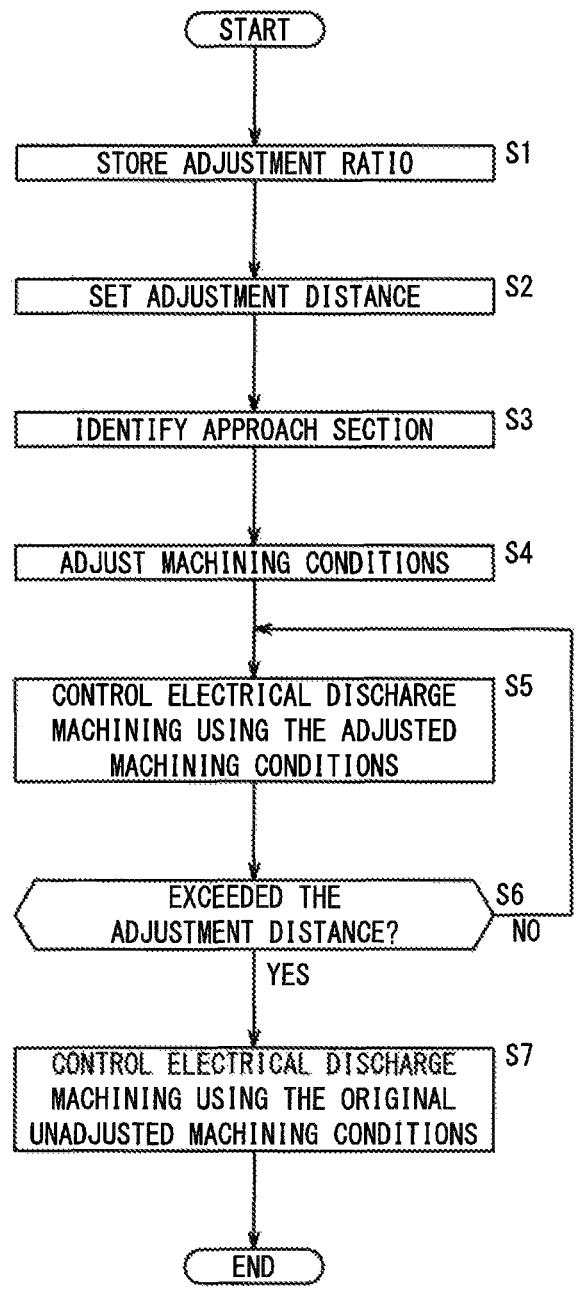
FIG. 9 is a flowchart for explaining a wire electrical discharge machining method according to the modified example 1.

FIG. 9 is a flowchart for explaining a wire electrical discharge machining method according to the modified example 1.

To begin with, the storage control unit 44 stores in the storage unit 40 the adjustment ratio which the acquisition unit 42 acquires from the operator's input through the operation unit 26, in association with the machining program and the machining condition as shown in FIG. 2 (Step S1).

Next, the setting unit 54 sets a distance designated by the operator through the operation unit 26 as the adjustment distance to be used by the electrical discharge machining control unit 36 (Step S2).

Then, the approach section identifying unit 52 identifies the approach section of the machining path for the wire electrode 16 with respect to the workpiece W, based on the machining program (Step S3).

Next, the adjustment unit 50 adjusts the machining conditions stored in the storage unit 40 based on the adjustment ratio stored in the storage unit 40 in association with the machining conditions (step S4).

After step S4, the electrical discharge machining control unit 36 performs electrical discharge machining control in the approach section identified by the approach section identifying unit 52, using the machining conditions adjusted at step S4 (step S5).

After step S5, the electrical discharge machining control unit 36 determines whether or not the moving distance of the wire electrode 16 from the start of cutting has exceeded the adjustment distance set at step S2 (step S6). If the moving distance has not exceeded the adjustment distance (step S6: NO), the process returns to step S5. If the moving distance has exceeded the adjustment distance (step S6: YES), the control proceeds to step S7.

At step S7, the electrical discharge machining control unit 36 performs electrical discharge machining control using the original (i.e., unadjusted) machining conditions.

According to the arithmetic device 10 of the modified example 1, the machining conditions at the start of cutting in wire electrical discharge machining can be automatically adjusted. That is, the discharge power at the start of cutting can be automatically reduced, so that it is possible to prevent breakage of the wire electrode 16 at the start of cutting. At the same time, automatic reduction of the relative speed of the wire electrode 16 relative to the workpiece W can keep the machined groove width at the same width as before the adjustment of the machining conditions.

Invention Obtained from the Embodiment

The invention that can be grasped from the above embodiment is described below.

The arithmetic device (10) includes: a storage unit (40) configured to store a plurality of machining programs for wire electrical discharge machining, each of the machining programs being associated with a machining condition corresponding to the machining program; an acquisition unit (42) configured to acquire an adjustment ratio of the machining condition input by an operator; and a storage control unit (44) configured to, when the acquisition unit (42) acquires the adjustment ratio, store the acquired adjustment ratio in the storage unit (40) in association with the machining program.

With this configuration, workload for adjusting the machining conditions in wire electrical discharge machining can be reduced.

The storage control unit (44) may be configured to, when the adjustment ratio is already stored in the storage unit (40) in association with the machining program, overwrite the adjustment ratio already stored in the storage unit (40), with the acquired adjustment ratio. This makes it possible to change the adjustment ratio to an adjustment ratio at which no breakage of the wire electrode (16) occurs.

The arithmetic device (10) may further include a display control unit (46) configured to display, on a display unit (28), a list of the plurality of machining programs stored in the storage unit (40), each of the machining programs being associated with the machining condition and the adjustment ratio.

The display control unit (46) may be configured to, when the machining program is selected by an operator operating an operation unit (26), display the adjustment ratio corresponding to the selected machining program in a manner that the adjustment ratio is adjustable. This allows the operator to change the adjustment ratio.

The arithmetic device (10) may a control device of a wire electrical discharge machine (12). The arithmetic device (10) may further include: an adjustment unit (50) configured to adjust the machining condition associated with the machining program, based on the adjustment ratio associated with the machining program; and an electrical discharge machining control unit (36) configured to perform electrical discharge machining on a workpiece (W) by applying voltage across a discharge gap between a wire electrode (16) and the workpiece (W) while causing the wire electrode (16) and the workpiece (W) to move relative to each other according to the machining program and the machining condition adjusted based on the adjustment ratio associated with the machining program.

The arithmetic device (10) may further include an approach section identifying unit (52) configured to identify an approach section of a machining path for the wire electrode (16) with respect to the workpiece (W), based on the machining program. The electrical discharge machining control unit (36) may be configured to perform electrical discharge machining control in the approach section, using the adjusted machining condition. This makes it possible to automatically adjust the machining condition at the start of cutting, to thereby prevent breakage of the wire electrode (16).

The electrical discharge machining control unit (36) may be configured to perform electrical discharge machining control from start of cutting up to a preset adjustment distance in the approach section, using the adjusted machining condition. This makes it possible to limit the range of machining subject to the adjusted machining condition in the approach section.

The arithmetic device (10) may further include a setting unit (54) configured to set a distance specified by an operator, as the adjustment distance. This configuration enables the operator to optionally set the machining range subject to the adjusted machining condition in the approach section, taking into account the machining shape and other factors.

The machining condition may include the pause time of voltage application and the relative speed of the wire electrode (16) relative to the workpiece (W). This makes it possible to keep the machined groove width at the same width as before the adjustment of the machining condition, while preventing breakage of the wire electrode (16).

The present invention is not particularly limited to the embodiment described above, and various modifications are possible without departing from the essence and gist of the present invention.

What is claimed is:

1. An arithmetic device, comprising:
a storage unit configured to store a plurality of machining programs for wire electrical discharge machining, each machining program of the machining programs being associated with a machining condition corresponding to the machining program;
an acquisition unit configured to acquire an adjustment ratio of the machining condition input by an operator; and
a storage control unit configured to, when the acquisition unit acquires the adjustment ratio, store the acquired adjustment ratio in the storage unit in association with the machining program,
wherein the storage control unit stores in the storage unit each of the machining programs as one file in which the machining condition and the adjustment ratio set at an appropriate value are associated with each other.

2. The arithmetic device according to claim 1, wherein the storage control unit is further configured to, when the adjustment ratio is already stored in the storage unit in association with the machining program, overwrite the adjustment ratio already stored in the storage unit, with the acquired adjustment ratio.

3. The arithmetic device according to claim 1, further comprising a display control unit configured to display, on a display unit, a list of the plurality of machining programs stored in the storage unit, each of the machining programs being associated with the machining condition and the adjustment ratio.

4. The arithmetic device according to claim 3, wherein the display control unit is further configured to, when the machining program is selected by the operator operating an operation unit, display the adjustment ratio corresponding to the selected machining program in a manner that the adjustment ratio is adjustable.

5. The arithmetic device according to claim 3, wherein the display control unit causes the display unit to display a list of the machining programs in association with the machining condition and the adjustment ratio stored in the storage unit for each of the machining programs.

6. The arithmetic device according to claim 1, wherein the arithmetic device includes a control device of a wire electrical discharge machine, the arithmetic device further comprising:

an adjustment unit configured to adjust the machining condition associated with the machining program, based on the adjustment ratio associated with the machining program; and an electrical discharge machining control unit configured to perform electrical discharge machining on a workpiece by applying voltage across a discharge gap between a wire electrode and the workpiece while causing the wire electrode and the workpiece to move relative to each other according to the machining program and the machining condition adjusted based on the adjustment ratio associated with the machining program.

7. The arithmetic device according to claim 6, further comprising an approach section identifying unit configured to identify an approach section of a machining path for the wire electrode with respect to the workpiece, based on the machining program, wherein the electrical discharge machining control unit is further configured to perform electrical discharge machining control in the approach section, using the adjusted machining condition.

8. The arithmetic device according to claim 7, wherein the electrical discharge machining control unit is further configured to perform electrical discharge machining control from a start of cutting up to a preset adjustment distance in the approach section, using the adjusted machining condition.

9. The arithmetic device according to claim 8, further comprising a setting unit configured to set a distance specified by an operator, as the adjustment distance.

10. The arithmetic device according to claim 6, wherein the machining condition includes a pause time of voltage application and a relative speed of the wire electrode relative to the workpiece.

11. The arithmetic device according to claim 1, wherein the storage control unit stores in the storage unit the appropriate value of the adjustment ratio in association with the machining program and the machining condition.

12. An arithmetic device, comprising:
a processor coupled to a memory storing a plurality of machining programs for wire electrical discharge machining, each machining program of the machining programs being associated with a machining condition corresponding to the machining program, the processor being configured to:
acquire an adjustment ratio of the machining condition input by an operator; and
when the adjustment ratio is acquired, store the acquired adjustment ratio in the memory in association with the machining program, wherein the processor stores in the memory each of the machining programs as one file in which the machining condition and the adjustment ratio set at an appropriate value are associated with each other.

13. The arithmetic device according to claim 12, wherein the processor is further configured to, when the adjustment ratio is already stored in the memory in association with the machining program, overwrite the adjustment ratio already stored in memory, with the acquired adjustment ratio.

14. The arithmetic device according to claim 12, wherein the processor is further configured to display, on a display screen, a list of the plurality of machining programs stored in the memory, each of the machining programs being associated with the machining condition and the adjustment ratio.

15. The arithmetic device according to claim 14, wherein the processor is further configured to cause a list of a plurality of machining programs being displayed in association with the machining condition and the adjustment ratio stored in the memory for each of the machining programs.

16. The arithmetic device according to claim 14, wherein the processor is further configured to, when the machining program is selected by the operator, display the adjustment ratio corresponding to the selected machining program in a manner that the adjustment ratio is adjustable.

17. The arithmetic device according to claim 12, wherein the arithmetic device includes a controller of a wire electrical discharge machine, the processor being further configured to adjust the machining condition associated with the machining program, based on the adjustment ratio associated with the machining program.

18. The arithmetic device according to claim 17, wherein the processor is further configured to perform electrical discharge machining on a workpiece by applying voltage across a discharge gap between a wire electrode and the workpiece while causing the wire electrode and the workpiece to move relative to each other according to the machining program and the machining condition adjusted based on the adjustment ratio associated with the machining program.

19. The arithmetic device according to claim 18, wherein the processor is further configured to identify an approach section of a machining path for the wire electrode with respect to the workpiece, based on the machining program.

20. The arithmetic device according to claim 19, wherein the processor is further configured to perform electrical discharge machining control using the adjusted machining condition.

* * * * *